United States Patent
Allard

(10) Patent No.: US 8,358,909 B2
(45) Date of Patent: Jan. 22, 2013

(54) COORDINATED OUTPUT OF MESSAGES AND CONTENT

(75) Inventor: James F Allard, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 794 days.

(21) Appl. No.: 12/037,907

(22) Filed: Feb. 26, 2008

(65) Prior Publication Data

US 2009/0214191 A1    Aug. 27, 2009

(51) Int. Cl.
*H04N 7/025* (2006.01)
*H04N 7/173* (2011.01)
*H04N 9/80* (2006.01)

(52) U.S. Cl. ........ 386/248; 386/240; 386/241; 386/243; 725/24; 725/32

(58) Field of Classification Search .................. None
See application file for complete search history.

(56) References Cited

U.S. PATENT DOCUMENTS

| | | | |
|---|---|---|---|
| 5,220,420 A | 6/1993 | Hoarty | |
| 6,237,049 B1 | 5/2001 | Ludtke | |
| 6,490,000 B1 | 12/2002 | Schaefer et al. | |
| 6,510,210 B1 | 1/2003 | Baughan | |
| 6,553,345 B1 | 4/2003 | Kuhn | |
| 6,650,248 B1 | 11/2003 | O'Donnell | |
| 6,741,684 B2 | 5/2004 | Kaars | |
| 6,972,680 B2 | 12/2005 | Yui et al. | |
| 6,986,148 B2 | 1/2006 | Johnson, Jr. | |
| 7,113,776 B2 | 9/2006 | Minear | |
| 7,146,632 B2 | 12/2006 | Miller | |
| 7,167,639 B2 | 1/2007 | Haddad et al. | |
| 7,218,838 B2 | 5/2007 | Ando et al. | |
| 7,233,925 B1 | 6/2007 | Grandcolas | |
| 7,240,327 B2 | 7/2007 | Singh | |
| 8,301,618 B2 | 10/2012 | Allard | |
| 2002/0095687 A1 | 7/2002 | Shintani | |
| 2002/0133827 A1* | 9/2002 | Newnam et al. | 725/89 |

(Continued)

FOREIGN PATENT DOCUMENTS

| | | |
|---|---|---|
| CN | 1747602 | 3/2006 |
| CN | 1777876 | 5/2006 |

(Continued)

OTHER PUBLICATIONS

"Intrinsyc Supports TVcompass on Windows CE Development for WiFi Smart Remote Control", http://www.intrinsyc.com/company/news/pressreleases/2006/06_06_2006.asp.

(Continued)

*Primary Examiner* — David Garcia Cervetti
*Assistant Examiner* — Fatoumata Traore
(74) *Attorney, Agent, or Firm* — Wolfe-SBMC

(57) ABSTRACT

A data stream is provided to a user in which a number of data streams may be integrated together at proper times within the data streams. For example, a first data stream may be displayed for a user while a second data stream may be received. The second data stream may be determined to contain data content corresponding to the first data stream in a particular temporal relationship. Based on a determination of various parameters or characteristics of the first and/or second data stream, the second data stream may be integrated into or combined with the first data stream at a desired time point within the first data stream to create a combination data stream. The combination data stream may be presented to the user.

18 Claims, 6 Drawing Sheets

U.S. PATENT DOCUMENTS

| | | | |
|---|---|---|---|
| 2003/0014496 A1 | 1/2003 | Spencer et al. | |
| 2003/0028873 A1 | 2/2003 | Lemmons | |
| 2003/0034957 A1 | 2/2003 | Dubil | |
| 2003/0039465 A1* | 2/2003 | Bjorgan et al. | 386/20 |
| 2003/0093790 A1* | 5/2003 | Logan et al. | 725/38 |
| 2003/0097664 A1 | 5/2003 | Meyers | |
| 2003/0163832 A1 | 8/2003 | Tsuria et al. | |
| 2003/0219234 A1 | 11/2003 | Burda | |
| 2004/0187076 A1 | 9/2004 | Ki et al. | |
| 2005/0076393 A1 | 4/2005 | Sussman | |
| 2005/0097618 A1 | 5/2005 | Arling et al. | |
| 2005/0149987 A1 | 7/2005 | Boccon-Gibod et al. | |
| 2005/0216563 A1 | 9/2005 | Stewart | |
| 2005/0220439 A1 | 10/2005 | Carton et al. | |
| 2005/0245272 A1 | 11/2005 | Spaur | |
| 2006/0063518 A1 | 3/2006 | Paddon | |
| 2006/0080710 A1 | 4/2006 | Carthern | |
| 2006/0136980 A1 | 6/2006 | Fulcher et al. | |
| 2006/0174277 A1 | 8/2006 | Sezan et al. | |
| 2006/0259930 A1 | 11/2006 | Rothschild | |
| 2006/0265731 A1 | 11/2006 | Matsuda | |
| 2006/0271980 A1 | 11/2006 | Mankovitz | |
| 2007/0133938 A1 | 6/2007 | Park | |
| 2007/0156847 A1 | 7/2007 | Berkvens | |
| 2007/0282995 A1 | 12/2007 | Mizuno et al. | |
| 2007/0294337 A1 | 12/2007 | Gaos et al. | |
| 2008/0127275 A1* | 5/2008 | Tang et al. | 725/56 |
| 2008/0201748 A1 | 8/2008 | Hasek et al. | |
| 2008/0208839 A1 | 8/2008 | Sheshagiri et al. | |
| 2008/0279453 A1 | 11/2008 | Candelore | |
| 2008/0305778 A1 | 12/2008 | Aaltonen et al. | |
| 2008/0320546 A1 | 12/2008 | Moon et al. | |
| 2009/0158323 A1 | 6/2009 | Bober et al. | |
| 2009/0164904 A1* | 6/2009 | Horowitz et al. | 715/723 |
| 2009/0216745 A1 | 8/2009 | Allard | |
| 2010/0011050 A1 | 1/2010 | Allard | |
| 2010/0235433 A1 | 9/2010 | Ansari et al. | |

FOREIGN PATENT DOCUMENTS

| | | |
|---|---|---|
| EP | 1276318 | 1/2003 |
| KR | 20040084395 | 10/2004 |
| KR | 100703567 | 3/2007 |
| WO | WO-0147256 | 6/2001 |
| WO | WO-2005099197 | 10/2005 |

OTHER PUBLICATIONS

"Harmony 880 Advanced Universal Remote (HD Ready)", http://www.ecost.com/detail.aspx?edp=3018056.

"Logitech Harmony Advanced Universal Remote Control 885", http://item.express.ebay.co.uk/Audio-TV-Electronics_Home-Audio-Hi-Fi_Remote-Controls_Logitech-Harmony-Advanced-Universal-Remote-Control-885_W0QQitem-Z9735155213QQihZ008QQptdnZRemoteQ20ControlsQQddn-ZAudioQ2cQ20TVQ20Q26Q20ElectronicsQQadnZHomeQ20-AudioQ20Q26Q2.

"Automated Selection of the Active Device in Interactive Multi", http://www.cs.colorado.edu/~rhan/ActiveDevice.pdf.

"Microsoft brings Windows Live Messenger to XBox 360", http://blogs.zdnet.com/social/?p=135.

"Developing Device Independent Java Applications with JSR 188", http://www.w3.org/2002/07/DIAT/posn/sun-jsr-188.html.

"PCT Search Report and Written Opinion", Application Number PCT/US2009/031841, (Sep. 7, 2009),11 pages.

"PCT Search Report and Written Opinion", Application Number PCT/US2009/031821, (Aug. 3, 2009),11 pages.

"Non-Final Office Action", U.S. Appl. No. 12/037,920, (Dec. 22, 2010),14 pages.

"Final Office Action", U.S. Appl. No. 12/037,899, (Jan. 18, 2011),25 pages.

"Non-Final Office Action", U.S. Appl. No. 12/037,899, (Aug. 5, 2010),16 pages.

Phung, et al., "Autonomic Control for Quality Collaborative Video Viewing", WOSS' 2004, ACM, 2004, pp.-5.

Brown, et al., "The Television Will Be Revolutionized: Effects of PVRs and Filesharing on Television Watching", Proceedings of the SIGCHI conference on Human Factors in computing systems, ACM, 2006, pp. 663-666.

"Final Office Action", U.S. Appl. No. 12/037,920, (Jun. 8, 2011),14 pages.

"Non-Final Office Action", U.S. Appl. No. 12/037,899, (Apr. 28, 2011),29 pages.

"Foreign Office Action", Chinese Application No. 200980106919.6, (May 3, 2012), 14 pages.

"Notice of Allowance", U.S. Appl. No. 12/037,899, (Jun. 12, 2012), 9 pages.

"Final Office Action", U.S. Appl. No. 12/037,899, (Oct. 28, 2011), 33 pages.

"Foreign Office Action", Chinese Application No. 200980106919.6, (Sep. 26, 2011), 8 pages.

"Non-Final Office Action", U.S. Appl. No. 12/037,899, (Jan. 27, 2012),31 pages.

"Extended European Search Report", European Patent Application No. 09715963.6, (Oct. 9, 2012), 9 pages.

"Foreign Office Action", Chinese Application No. 200980107020.6, (Aug. 2, 2012), 16 pages.

"Non-Final Office Action", U.S. Appl. No. 13/586,276, (Sep. 14, 2012), 12 pages.

Drucker, Steven M., et al., "SmartSkip: Consumer level browsing and skipping of digital video content", *In Proceedings of CHI 2002*, Available at <http://citeseerx.ist.psu.edu/viewdoc/download?doi=10.1.1.94.7249&rep=rep1&type=pdf>, (Apr. 2002), 8 pages.

* cited by examiner

COORDINATED OUTPUT OF MESSAGES AND CONTENT

BACKGROUND

Users have grown accustomed to viewing data content at a desired time. For example, a user may wish to watch a television program at a time that is more convenient for the user rather than having to adjust a schedule to watch the television program when the television program is broadcast. However, with such time-delayed enjoyment of programming, there have been problems with correlating activities between users who are experiencing programming at different times.

In one example, one user may be watching a program on television in a time-delayed fashion. Another user may be watching the same program concurrently but may be watching the program "live". In this case, the two users do not share the same experience simultaneously and one user may either inadvertently or deliberately spoil the program for the other by informing the other user of subsequent events that are not yet viewed by the other user.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one example, first data or a first data stream is provided to a user while second data or a second data stream is received. The second data may contain a parameter for indicating a status of the second data and/or a relationship between the second data to the first data being provided to the user. Based on the parameter or indicator, the second data may be processed and/or displayed to the user. For example, the second data may be presented in conjunction with or integrated with the first data or may be presented within the first data at a specified time with respect to the timing of the event or program being displayed.

In another example, a combination data stream may be generated based on a characteristic of one of the data stream. For example, a first data stream may be displayed while a second data stream is received with a characteristic. The characteristic may include, for example, a time stamp indicating a time of the second data stream and/or a location parameter indicating a location of a data source providing the second data stream. Based on the characteristic, the second data stream may be displayed with the first data stream. For example, the second data stream may be integrated into the first data stream at a desired time point in the first data stream to create a combination data stream. The combination data stream may be displayed to a user. Also, an alert may be provided to the user to indicate a status of the first data stream, second data stream or combination data stream.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Overview

There are a wide variety of delivery techniques that may be used to output content, and the techniques are ever increasing. For example, a user may record a television program for later viewing using a digital video recorder (DVR), thereby "time shifting" an output of the television program. However, another user may watch television program "live", e.g., as it is broadcast. Therefore, a message sent from the user that watched the television program live may spoil the user's enjoyment that wished to output the television program later using time shifting techniques.

In an implementation, techniques are described to coordinate output of messages with content. For example, a time in relation to an output of content may be determined, such as an original broadcast time in relation to an output of a television program. When a message is received that pertains to the content, output of the message may be coordinated with the content, such as to delay output of the message, output a warning before the message is output, and so on, further discussion of which may be found in relation to the following figures.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples. Systems described herein are provided as examples and not limitations. As those skilled in the art will appreciate, the present examples are suitable for application in a variety of different types of systems.

Exemplary Environment

Figure 1:
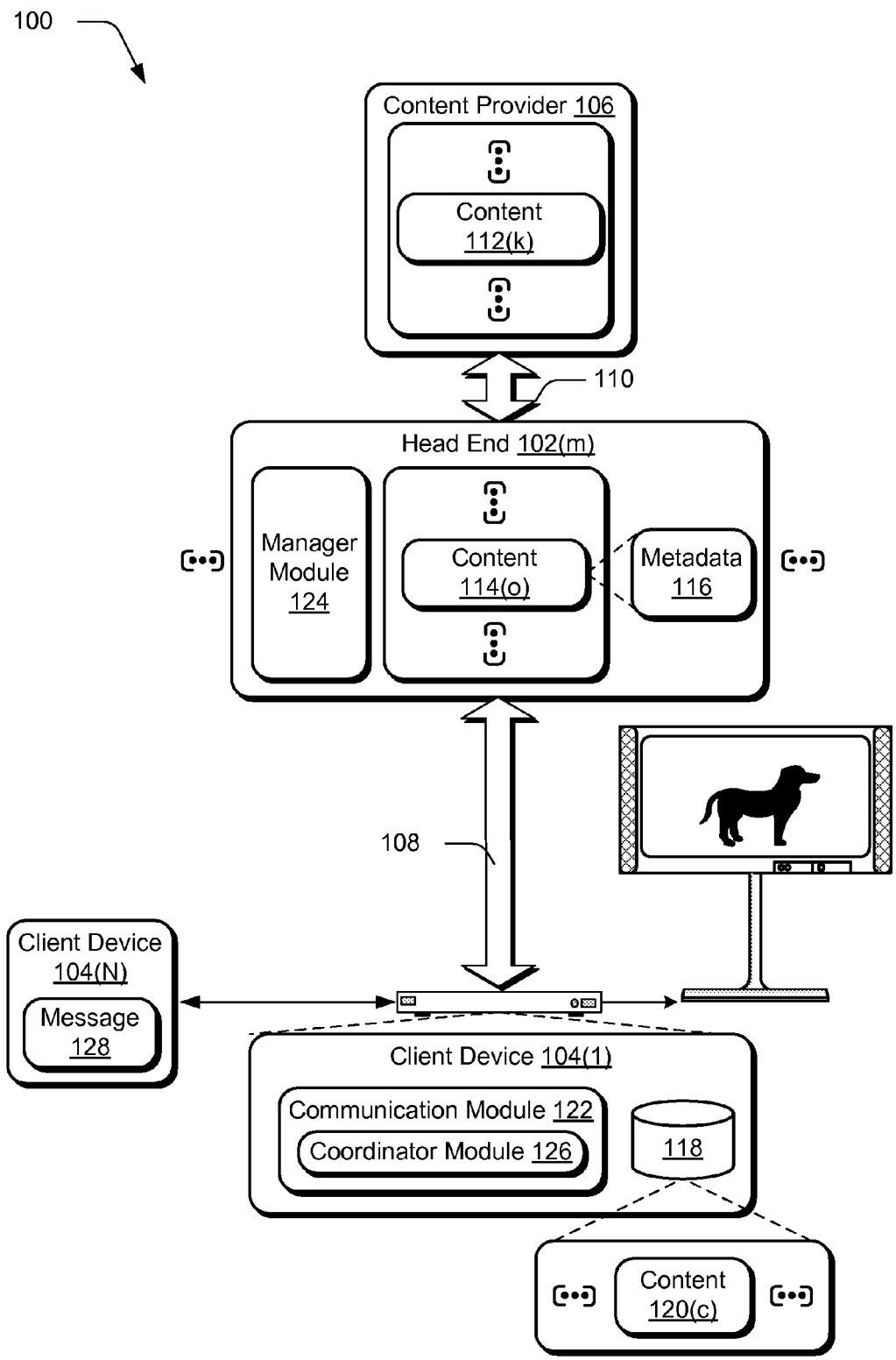
FIG. 1 illustrates an example of a suitable computing system environment.

FIG. 1 is an illustration of an environment 100 in an exemplary implementation that is operable to employ content and message coordination techniques. The illustrated environment 100 includes one or more head ends 102(m) (where "m" can be any integer from one to "M") of a network operator, a plurality of client devices 104(1)-104(N) and a content provider 106 that are communicatively coupled, one to another, via network connections 108, 110. In the following discussion, the head end 102(m) and the content provider 106 may be representative of one or more entities. Therefore reference may be made to a single entity (e.g., the head end 102(m)) or multiple entities (e.g., the head ends 102(m), the plurality of content providers 106, and so on). Additionally, although a plurality of network connections 108, 110 are shown separately, the network connections 108, 110 may be representative of network connections achieved using a single network or multiple networks. For example, network connection 108 may be representative of a broadcast network with back channel communication, an Internet Protocol (IP) network, and so on.

The client devices 104(1)-104(N) may be configured in a variety of ways. For example, the client devices 104(1)-104(N) may be configured as a computer that is capable of communicating over the network connection 108, such as a desktop computer, a mobile station, an entertainment appliance, a set-top box communicatively coupled to a display device as illustrated, a wireless phone, and so forth.

The content provider 106 includes one or more items of content 112(k), where "k" can be any integer from 1 to "K". The content 112(k) may include a variety of data, such as television programming, video-on-demand (VOD) files, and so on. The content 112(k) is communicated over the network connection 110 to the head end 102(m).

Content 112(k) communicated via the network connection 110 is received by the head end 102(m) and may be stored as one or more items of content 114(o), where "o" can be any integer from "1" to "O". The content 114(o) may be the same as or different from the content 112(k) received from the content provider 106. The content 114(o), for instance, may include additional data for broadcast to the client device 104, an example of which is illustrated as metadata 116.

Distribution of the content 114(o) (and also the metadata 116 in this example) from the head end 102(m) to the client device 104 may be accommodated in a number of ways, including cable, radio frequency (RF), microwave, digital subscriber line (DSL), satellite, via Internet Protocol (IP) connection, and so on.

The client devices 104(1)-104(N) may be configured in a variety of ways to receive the content 114(o) over the network connection 108. The client devices 104(1)-104(N) typically include hardware and software to transport and decrypt content 114(o) received from the head end 102(m) for rendering by the illustrated display device. Although a display device is shown, a variety of other output devices are also contemplated, such as speakers.

The client devices 104(1)-104(N) may also include digital video recorder (DVR) functionality. For instance, the client device 104(1) may include memory 118 to record content 114(o) as content 120(c) (where "c" can be any integer from one to "C") received via the network connection 108 for output to and rendering by the display device. Thus, content 120(c) that is stored in the memory 118 of the client device 104 may be copies of the content 114(o) that was streamed from the head end 102(m).

The client device 104(1) includes a communication module 122 that is executable on the client device 104 to control content playback on the client device 104, such as through the use of one or more "command modes", i.e., "trick modes", to tune to a particular channel, order pay-per-view content, and so on. The command modes may provide time shifting techniques to provide non-linear playback of the content 120(c) such as pause, rewind, fast forward, slow motion playback, and the like.

The head end 102(m) is illustrated as including a manager module 124. The manager module 124 is representative of functionality to configure content 114(o) for output (e.g., streaming) over the network connection 108 to the client device 104. The manager module 124, for instance, may configure content 112(k) received from the content provider 106 to be suitable for transmission over the network connection 108, such as to "packetize" the content for distribution over the Internet, configuration for a particular broadcast channel, map the content 112(k) to particular channels, and so on.

Thus, in the environment 100 of FIG. 1, the content provider 106 may broadcast the content 112(k) over a network connection 110 to a multiplicity of network operators, an example of which is illustrated as head end 102(m). The head end 102(m) may then stream the content 114(o) over a network connection to a multitude of client devices, examples of which is illustrated as client devices 104(1)-104(N). The client device 104(1), for instance, may then store the content 114(o) in the memory 118 as content 120(c) and/or render the content 114(o) immediately for output as it is received, such as when the client device 104 is configured to include digital video recorder (DVR) functionality.

The client device 104(1) is also illustrated as including a coordinator module 126 that is representative of functionality to coordinate output of the content 120(c) with messages, such as a message 128 received from the client device 104(N). For example, output of the content 120(c) may be time-shifted as previously described. The message 128, however, may relate to the content 120(c), such as by including information that would "spoil" an output of the content 120(c), such as by mentioning a conclusion of the content 120(c). Accordingly, the coordinator module 126 may coordinate output of the message 128 with the content 120(c), which may be performed in a variety of ways.

That coordinator module 126, for instance, may determine a particular time in an output of content, such as an original time a portion of the content 120(c) that is currently being output was originally broadcast. The coordinator module 122 may also receive the message 128 from a client device 104(N) and determine when the message was sent, such as by comparing timestamps in the content 120(c) with a timestamp in the message 128. For example, the timestamps may be translated by the coordinator module 126 to be suitable for comparison, such as to translate from different time zones, different time formats, and so on.

When the point in time that the message was sent is later than the particular time in the output of the content, the coordinator module 126 may take a variety of actions. For instance, the coordinator module 126 may block output of the message 128 until the particular time in the output of the content corresponds to the point in time that the message was sent. In another instance, a warning may be output that the message 128 may contain information that could spoil output of the content. For example, the coordinator module 126 may determine that the message 128 relates to the content 120(c), such as a mention in text of a title of the content 120(c). An alert may then be output before output of the message 128 that indicates the result of this determination, thus "warning" a user of the client device 104(1) as to the subject matter of the message 128.

In another example, a sender of the message (e.g., a user of client device 104(N)) may be made aware of the coordination techniques being employed. For instance, the coordinator module 126 may determine that the client device 104(1) has not yet output content 120(c) and/or a particular portion of the content 120(c) that is described in the message 128. A notification may then be formed by the coordinator module 126 that informs a user of the client device 104(N) that the message 128 sent is being coordinated with output of the content 120(c), e.g., output is being delaying delayed, a warning output, and so on.

In yet another example, the coordinator module 126 may also take into account location information. For instance, the location from which a message was sent may relate to a location of the content, such as by being sent by a fan attending a sporting event that is also a subject of the content 120(*c*). If such a correspondence is detected, the warning may also include information that describes this correspondence. A variety of other examples are also contemplated, further discussion of which may be found in relation to the following figures.

Generally, any of the functions described herein can be implemented using software, firmware, hardware (e.g., fixed-logic circuitry), manual processing, or a combination of these implementations. The terms "module", "functionality", "engine" and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer-readable memory devices, such as the memory 118. The features of the techniques described herein are platform-independent, meaning that the techniques may be implemented on a variety of commercial computing platforms having a variety of processors.

Figure 2:
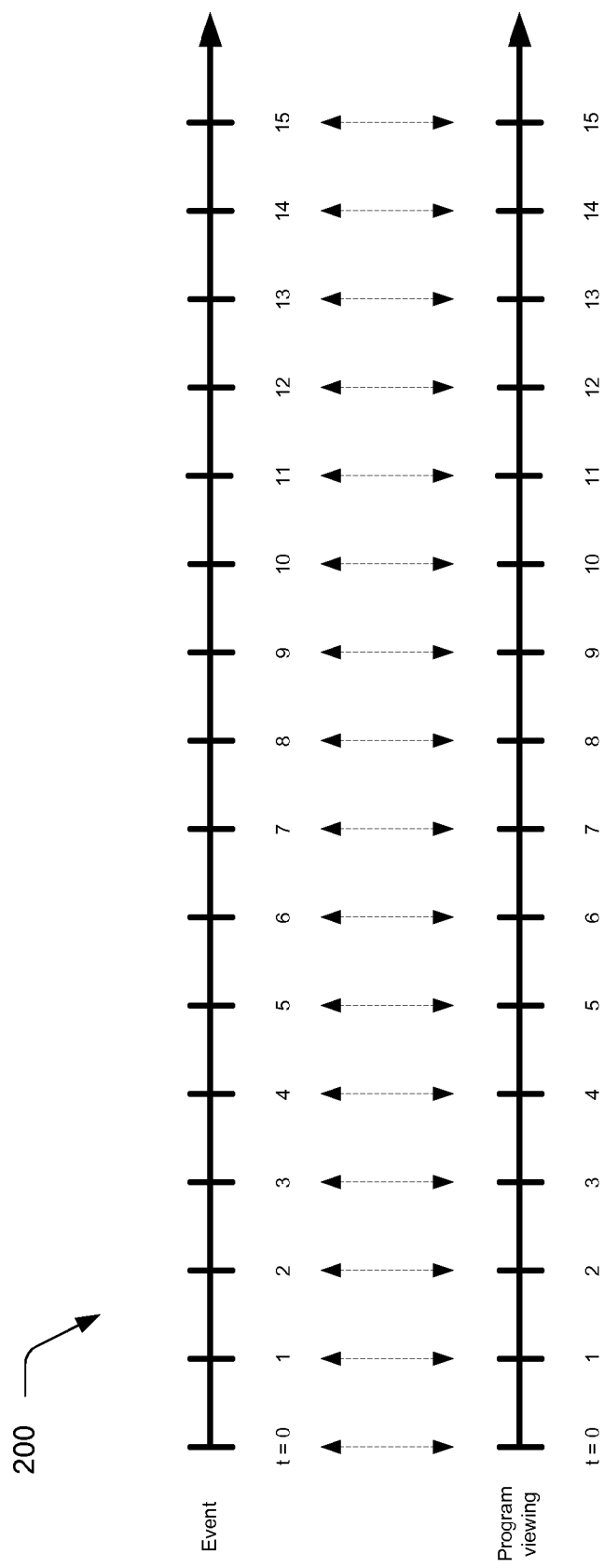
FIG. 2 illustrates timelines of a program or event received in real-time.

FIG. 2 illustrates timelines of a program or event received in real-time. For each time (e.g., t equal 0-15), portions of the event are viewed at substantially the same time. Hence, as FIG. 2 illustrates, a viewer who is viewing the event is receiving the event in real-time. A user or group of users may be receiving a data stream. The data stream may include any desired information such as, for example, video and/or audio data. For example, a program or event may be provided on a display device for a user or group of users. In addition, the program or event may be displayed in real-time or may be time-delayed. In the case of a real-time display of data content, the data content may be displayed on a display device at substantially the same time as the event which the data content represents. As one example, the display device may include a television or other video device and a program, sporting event, or other activity may be occurring at an event location and may be televised or broadcast to remote locations for viewing at the remote locations. Users or groups of users at any of the remote locations may be viewing the activity as the activity occurs at the event location. In this way, users may experience the event "live".

Also, the program or event may be time-delayed for the user or group of users viewing the program or event. For example, the user or group of users may be observing the event as it may have occurred a period of time beforehand. In this case, the actual event may have occurred and may be already completed while the user or group of users views a display of the event on a display device, such as by time-shifting the output of the event using a digital video recorder. Hence, the program or event in this example is time-delayed such that events that are being viewed by the user or group of users have already occurred. Alternatively, the event may not have completed but the user or group of users may be observing an earlier portion of the event that may have already occurred while later portions of the program or event are ongoing. Thus, a user or group of users may be observing from a particular time period of a program or event while the actual program or event may be in progress but at a subsequent time.

Figure 3:
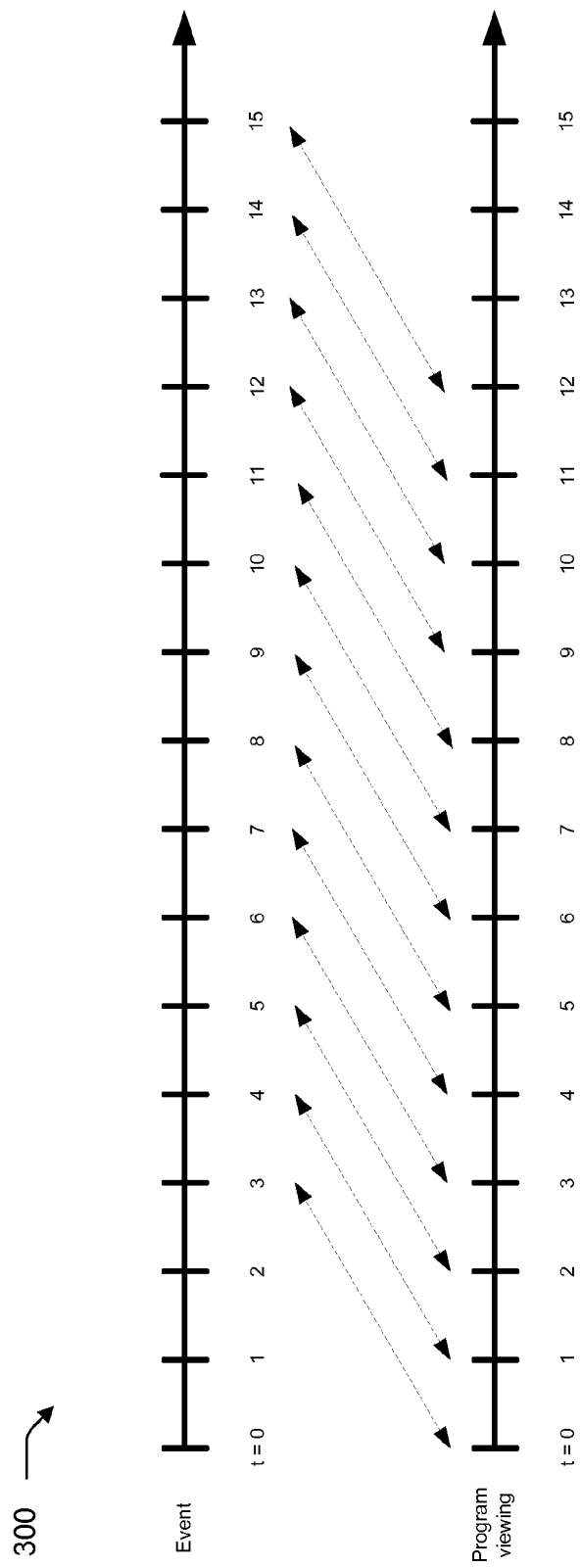
FIG. 3 illustrates timelines of a program or event that is time-delayed.

FIG. 3 illustrates timelines of a program or event that is time-delayed. In this example, a portion of an event occurs at a particular time but is viewed by a viewer at a later time. As FIG. 3 illustrates, a portion of an event occurring at t equal 3 is viewed in a time-delayed program at t equal 0. Hence, in this example, the program or event is delayed by a unit of 3.

Figure 4:
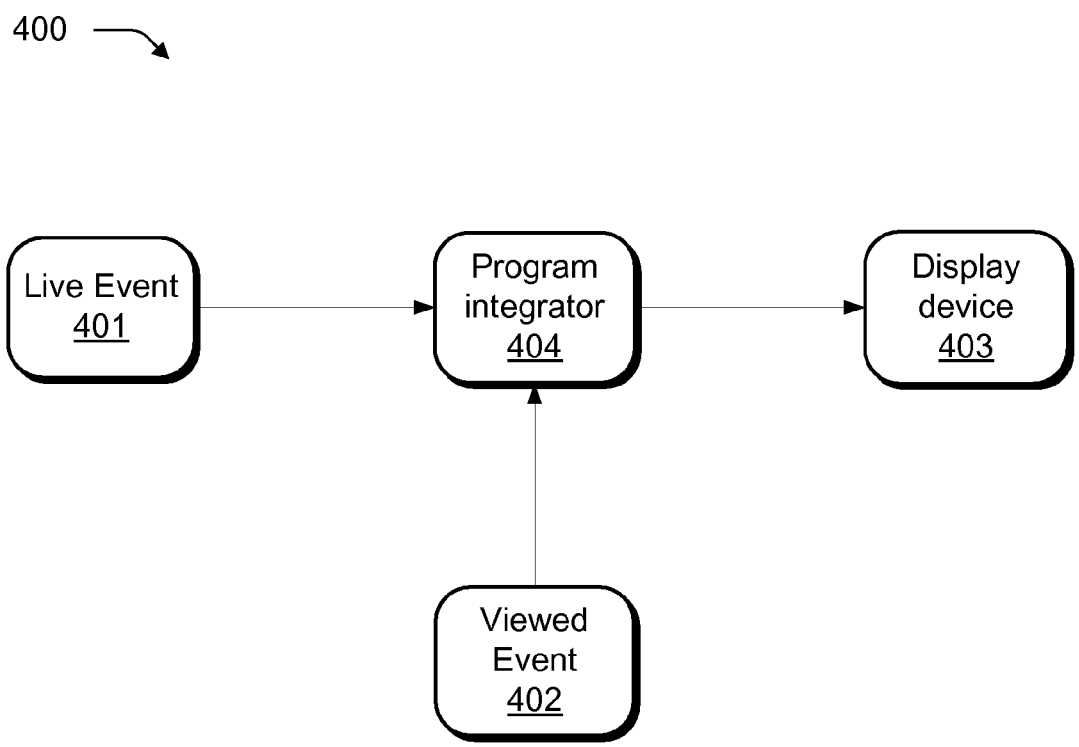
FIG. 4 illustrates one example of a system for receiving or displaying a time-delayed event.

FIG. 4 illustrates one example of a system for receiving or displaying a time-delayed event. In this example, a viewed event 402 is viewed on a display device 403. The viewed event 402 may include a time-delayed presentation of an event that may have occurred at a previous time. As FIG. 4 illustrates a live event 401 may be occurring that may correspond to the viewed event 402 with the live event 401 occurring at a time that is previous to the delayed viewed event 402. Also illustrated in FIG. 4 is a program integrator 404 that may integrate information from the live event 401 into the viewed event 402 and present the combined data to the display device 403. The program integrator 404 may, for example, determine a time or location of the data from the live event 401 and may match the data from the live event 401 with portions of the viewed event 402 to be subsequently displayed on the display device 403. Based on this determination, the program integrator 404 may insert the data from the live event 401 into the program of the viewed event 402 at a desired location within the viewed event 402. This process will be described in further detail below.

In one example, a first user or group of users may be viewing a program or event on a display device of the client device 104(1) of FIG. 1 while a second user (e.g., of client device 104(N)) may send a transmission to the first user or group of users. For example, a second user may send or transmit a communication (e.g., message 128) to the first user. The communication may include a variety of methods of communication including, but not limited to, a phone call, an e-mail, text message, transmission of a data stream, and so on. The communication from the second user may be associated with the program or event being viewed by the first user or group of users, such as content 120(*c*).

As one illustrative example, the first user or group of users may be viewing a sports event (e.g., Super Bowl) on a display device of the client device 104(1). The sports event being displayed on the display device for the first user or group of users may be time-delayed such that the first user or group of users are viewing segments of the sports event that have already occurred in actual real-time, e.g., through use of time-shifting techniques and command modes as previously described in relation to the DVR example of FIG. 1.

The time difference between the live sports event as compared to the time of the sports event being viewed by the user or group of users may be of any length. For example, the time difference may be one minute in which case the first user or group of users may be viewing the sports event from one minute prior to the actual time of the live event.

In this example, the second user of client device 104(N) may send or transmit the communication (e.g., message 128) to the first user of client device 104(1) where the communication pertains to the sports event, e.g., content 120(*c*). The communication may be associated with the sports event in any way and may contain any amount or type of data content. For example, the communication may include video and/or audio of the sports event at a time that is subsequent to the time of the sports event (e.g., content 120(*c*)) being viewed by the first user or group of users at client device 104(1). In this case, the communication contains data of events not yet viewed by the first user or group of users (i.e., "spoilers") of the client device 104(1).

In addition, the communication from the second user of client device 104(N) may contain an indicator that indicates a time associated with the communication. For example, the indicator may include a time stamp. The time stamp in this example may indicate a time of occurrence of the communication or may indicate a time of occurrence of the program or event (e.g., the sports event). Also, a time stamp may be associated with the program or event being viewed by the first user or group of users, e.g., the content 120(c) output by the client device 104(1). When the communication is received at the client device 104(1) of the first user or group of users, the client device 104(1) may identify the time of occurrence of the communication (e.g., "when" the message 128 was sent) or the program or event described in the communication, e.g., "when" the described event occurred. This identification may be accomplished via the time stamp of the communication, for example, a universal time (e.g., Greenwich Mean Time), and so on. The time stamp of the communication may be compared to the time stamp of the program or event being viewed by the first user or group of users. If a match is identified, the communication may be output to the first user or group of users at the client device 104(1).

Also, if the time of the communication is identified to be greater than the time of the program or event being viewed by the first user or group of users at the client device 104(1), data in the communication (e.g., the message 128) may be withheld from the first user or group of users as the time of the program or event being viewed by the first user or group of users progresses.

When the time of the program or event being viewed by the first user or group of users of client device 104(1) corresponds to a particular point in time associated with the message 128 (e.g., when it was sent or when a described event in the message 128 occurred), the data in the communication from the second user of client device 104(N) may be viewed by the first user or group of users of client device 104(1).

In this example, the time of the program or event being viewed by the first user or group of users of client device 104(1) may be monitored as the time progresses. When the time being monitored matches substantially the time associated with the communication or the data in the communication (e.g., the message 128) from the second user of client device 104(N), the data in the communication is provided to the first user or group of users of client device 104(1). Hence, the communication or data in the communication from the second user of client device 104(N) may be incorporated or embedded into the program or event being viewed by the first user or group of users of client device 104(1) at a desired point within the program or event, e.g., content 120(c). In this way, the first user or group of users of client device 104(1) may receive data in a desired sequence, e.g., not "spoiling" output of the content 120(c).

In another example, an alert may be provided to the first user or group of users of client device 104(1) if the data in the communication (e.g., message 128) from the second user of client device 104(N) is not incorporated into the data stream (e.g., content 120(c)) being viewed by the first user or group of users. Of client device 104(1). For instance, if the communication (e.g., message 128) from the second user of client device 104(N) is determined to be later in time than the program or event (e.g., content 120(c)) being viewed by the first user or group of users of client device 104(1), the communication (e.g., message 128) is not immediately presented to the first user or group of users of client device 104(1). Rather, the communication (e.g., message 128) is deferred such that the communication is to be presented at a later point in time.

An alert may be provided to the first user or group of users of client device 104(1) to indicate the deferral of the communication, e.g., message 128. This alert may be of any desired form. For example, the alert may be an audible message, a ringtone, a text message, an e-mail, and so on. Alternatively, the communication may be incorporated immediately into the program or event (e.g., content 120(c)) being viewed by the first user or group of users of client device 104(1) with an alert that the communication (e.g., message 128) may contain spoilers.

The first user or group of users of client device 104(1) may have an option to disable the communication, if desired. For example, the first user or group of users of client device 104(1) may send a signal to either remove the data from the communication (e.g., message 128), defer the data to an appropriate point in time of the program or event (e.g., content 120(c) being viewed at the client device 104(1), and so on.

In another example, a time associated with the communication (e.g., message 128) from the second user of client device 104(N) may be identified to be less than the time of the program or event being viewed by the first user or group of users at client device 104(1). In this case, data in the communication (e.g., message 128) may be presented to the first user or group of users of client device 104(1) either separately or in unison. For example, data in the communication may be presented to the first user or group of users of client device 104(1) as a picture-in-picture (PIP) presentation, split screen, overlay, and so forth. Alternatively, the data in the communication (e.g., message 128) may be withheld from the first user or group of users at client device 104(1) or may be presented at a subsequent time. Also, an alert may be provided to the first user or group of users of client device 014(1) indicating the receipt of data in the communication (e.g., message 128 from client device 104(N)) that may include program or event data that has been viewed already, e.g., the content 120(c).

Figure 5:
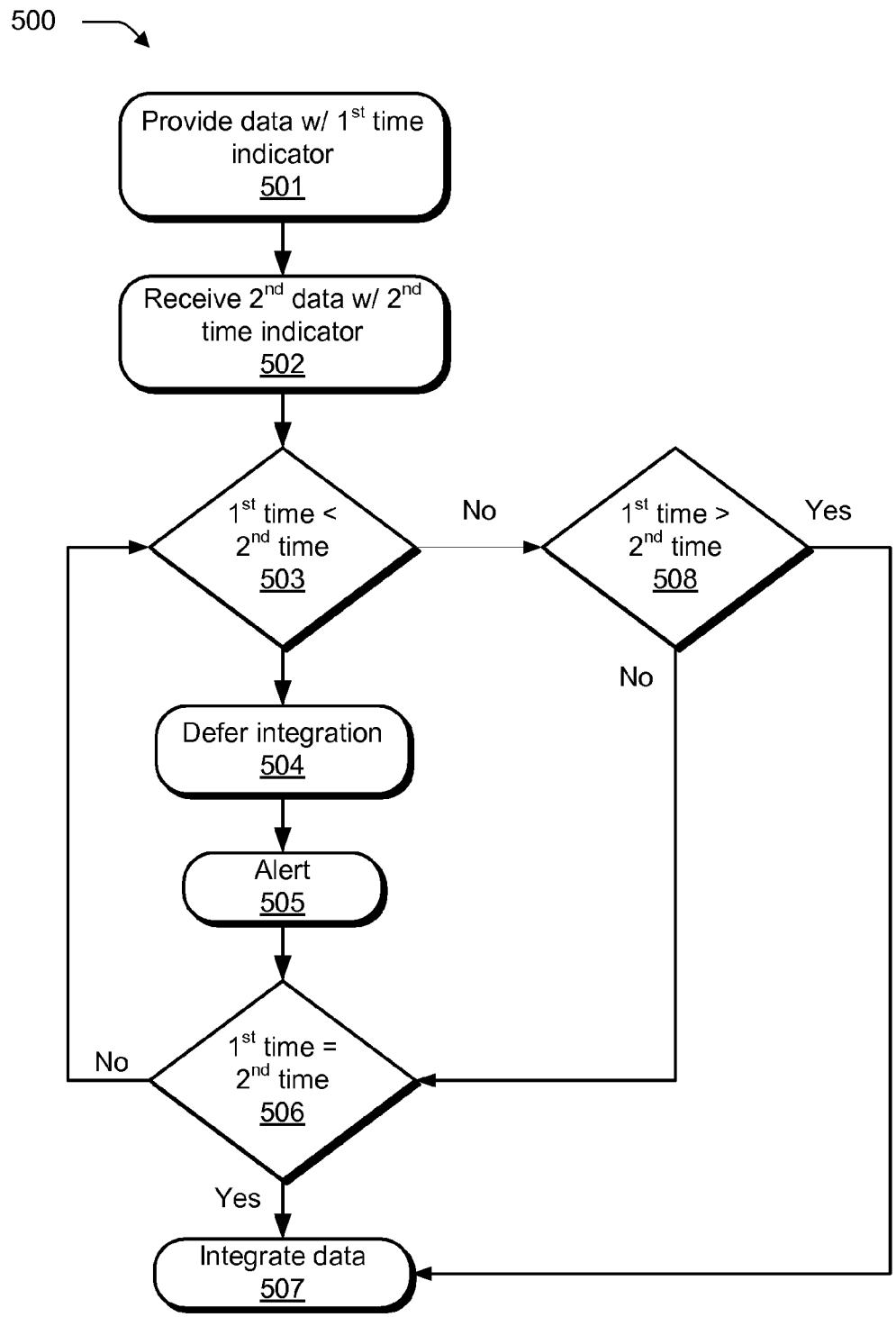
FIG. 5 is a flowchart illustrating one example of integrating a data stream into another data stream based on a time indicator.

FIG. 5 is a flowchart illustrating one example 500 of integrating a data stream into another data stream based on a time indicator. In this example, a first data stream and a second data stream are integrated into a combined data stream. The second data stream is integrated into the first data stream at a desired point of time within the first data stream.

The first data stream is displayed or provided, for example, on a display device (block 501) of client device 104(1). A second data stream is then received (block 502) at the client device 104(1). Each of the data streams may include an indicator of the respective times for each of the data streams. For example, the first data stream may include an indicator such as a time stamp for identifying a time of the event being provided or displayed. Likewise, the second data stream may also have an indicator such as a time stamp that indicates the time of the activity or event associated with the second data stream.

The time indicator of the first data stream may be different from the time indicator of the second data stream. For example, the second data stream may contain information corresponding to an event at a time that is subsequent to the time of the event being displayed in the first data stream.

The first time indicator is compared to the second time indicator (decision block 503). If the second time indicator is greater than the first time indicator ("Yes" from decision block 503), then the first data stream of the event may be at a time prior to the time of the second data stream. In this case, integration of the second data stream into the first data stream may be deferred (block 504). For example, integration of the second data stream into the first data stream may be deferred until a point in time in which the second time indicator is substantially equal to or past a current time of the first data stream being displayed relative to the event. If desired, an alert may be provided (block 505) to a user to notify the user that a data stream (e.g., the second data stream) has been received but display of the data stream will be delayed. The process may further wait until the first time indicator and the second time indicator are substantially equal (decision block 506, "Yes" branch) for integration of the second data stream into the first data stream. If the first time indicator indicating the current time of the event in the first data stream is less than the second time indicator indicating the time of the event in the second data stream, then deferral of the integration continues ("No" branch of decision block 506) until the first time indicator and the second time indicator are substantially equal ("Yes" branch of decision block 506).

However, if the first time indicator is greater than the second time indicator ("Yes" branch of decision block 508), then the event as provided in the second data stream occurred prior to the event being displayed to the user of the client device 104(1). The second data stream may be integrated into the first data stream (block 507). Otherwise, if the first time indicator and the second time indicator are the same ("No" branch of decision block 508 and "Yes" branch of decision block 506), then the second data stream may be integrated into the first data stream. In addition, the second data stream may be integrated into the first data stream at a time point in the first data stream corresponding to the second time indicator.

In another example, the communication from the second user (e.g., message 128 from client device 104(N)) may contain location data. The location data may describe, for example, the location of the second user (e.g., client device 104(N)) and may be obtained by any variety of methods. For instance, the second user may be using a communication device (e.g., client device 104(N)) such as a cell phone equipped with GPS such that the communication generated and sent by the second user may indicate a location of the second user, e.g., the client device 104(N) that originated the message 128. In this example, the communication may be received by the first user or group of users of client device 104(1) with the location data describing the location of the second user of client device 104(N). If the location of the second user is determined to be associated with the event (e.g., content 120(c)) being viewed by the first user or group of users of client device 104(1), the communication may be managed or handled accordingly.

For instance, the time of the communication or event within the communication (e.g., message 128) may be matched with the time of the event (e.g., content 120(c)) being viewed by the first user or group of users of client device 104(1) as described above. Data from the communication from the second user of client device 104(N) may be incorporated in the data stream being presented to the first user or group of users at client device 104(1) at the proper point within the data stream (e.g., content 120(c)) to provide a coordinated display of the event (e.g., message 128 and content 120(c)) in temporal order.

In another example, a parameter may be associated with the communication (e.g., message 128) to indicate that viewing the communication may be inappropriate in view of the data stream being viewed by the first user or group of users of client device 104(1). Based on the parameter, the communication (e.g., message 128) from the second user of client 104(N) may be blocked, filtered, or deferred. Alternatively, an alert may be provided to the first user or group of users of client device 104(1) to indicate that the communication may contain material not suitable to be viewed at the present time in the output of content 120(c). A variety of other examples are also contemplated.

Figure 6:
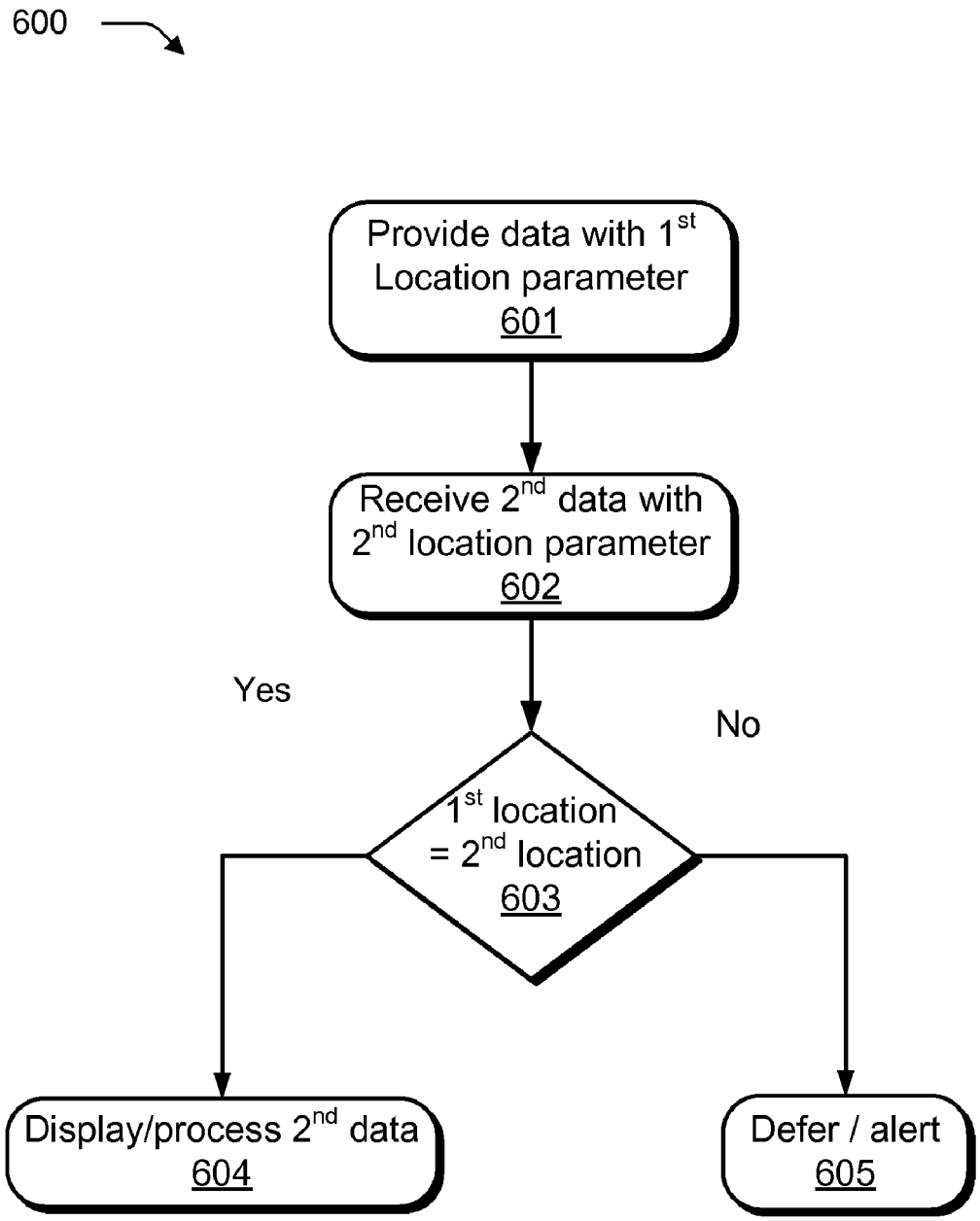
FIG. 6 is a flowchart illustrating an example of providing data streams based on a location parameter.

FIG. 6 is a flowchart 600 illustrating an example of providing data streams based on a location parameter. In this example, a first data stream may be displayed for a user (block 601), e.g., content 120(c) at client device 104(1). The first data stream may also contain a location parameter that indicates a location of an event being displayed in the first data stream. A second data stream may be received by the user (block 602) (e.g., message 128 streamed from client device 104(N)) which may also contain a location parameter indicating a location of an event corresponding to data in the second data stream. For example, the second data stream may contain a video clip of events pertaining to the event at a location indicated by the second location parameter.

The first location parameter and the second location parameter are compared (decision block 603). If the first location parameter and the second location parameter are not equivalent ("No" branch of block 603), then the event associated with the second data stream (e.g., message 128) may not be the same as the event associated with the first data stream, e.g., content 120(c). In this case, the second data stream may be received by the user (block 604) and may be displayed or otherwise processed.

Alternatively, the first location parameter and the second location parameter may be equivalent which may indicate that the event corresponding to the first data stream is the same event as the event corresponding to the second data stream ("Yes" branch of decision block 603). In this case, display of the data in the second data stream (e.g., message 128) may be deferred or an alert may be provided to the user of the client device 104(1) to indicate that the data received in the second data stream may correspond to the event being viewed in the first data stream (block 605), e.g., content 120(c).

In another example, a parameter or combination of parameters is used to determine processing of received data. In this example, a first data stream (e.g., content 120(c)) may be displayed on a display device of the client device 104(1) while a second data stream may be received from a data source, e.g., message 128 from client device 104(N). The data source may be configured as an entity capable of providing transmitted data. For example, the data source may include a user at a remote location, e.g., a user of client device 104(N) configured as a wireless phone. In one example, a user at an event sends video information pertaining to an experience at the event using the wireless phone (i.e., client device 104(N)). The user may send the video information to another user who is not present at the event but may be viewing the event at a remote location (e.g., on television at home such as client device 104(1)). The user may send the video information (e.g., message 128) with additional information to inform the receiving user of client device 104(1) of the nature of the video information being sent. For example, the user of client device 104(N) sending the video information may include the video information in an email with certain terms in the subject line or in the body of the email. The receiving user of client device 104(1) may scan the email for keywords that may signal that the video information should not be viewed immediately. Based on the keywords or information provided in the subject line or other indication provided by the sender, for example, the video information of message 128 may be processed accordingly. For instance, video information corresponding to event coverage at a time subsequent to the time of the viewing of the event by the first user at client device 104(1) may be deferred. The video information may then be provided after the time of viewing of the event by the first user reaches a corresponding time of the video information.

Also, a variety of factors may be combined to determine handling of received data content. For example, a time stamp associated with the message 128 received from the client device 104(N) may be compared to a time indicator of content 114(o) being provided to a user from the head end 102(m). If the time indicated by the time stamp of the message 128 is greater than the time indicated for the content 114(*o*) from the head end 102(*m*), then the message 128 may represent data captured at a later time than the content 114(*o*) being viewed from the head end 102(*m*). Also, location data corresponding to a location of the data source (e.g., client device 104(N)) providing the message 128 to the user of client device 104(1) may be compared to location information of an event provided to the user in the content 114(*o*) from the head end 102(*m*).

If the location data of the source providing the message 128 (e.g., client device 104(N)) indicates the same location as the event being viewed and the time indicated by the time stamp of the received content 114(*o*) indicates that message 128 occurred at a later time than the content 114(*o*) being viewed, then the message 128 may be processed accordingly. For example, display of the message 128 may be deferred, the message 128 may be integrated into the content 114(*o*) being viewed at a desired time (e.g., at a time in the data being viewed matching the time stamp of the received data), an alert may be provided to indicate the status of the received data content, and so on to name a few.

Thus, as described, information pertaining to the event being viewed by the first user or group of users at the client device 104(1) from the received communication may be incorporated or integrated into the program or event being viewed by the first user or group of users. The received communication (e.g., message 128) may thus be incorporated into the program or event being viewed by the first user or group of users of client device 104(1) at a time in the program corresponding to the time of viewing of the relevant portion of the video/audio and/or the location of the sender of the communication.

It is understood that aspects of the present description can take many forms and embodiments. The embodiments shown herein are intended to illustrate rather than to limit the description, it being appreciated that variations may be made without departing from the spirit of the scope of the invention. Although illustrative embodiments have been shown and described, a wide range of modification, change and substitution is intended in the foregoing disclosure and in some instances some features may be employed without a corresponding use of the other features. Accordingly, it is appropriate that the appended claims be construed broadly and in a manner consistent with the scope of the description.

What is claimed is:

1. A computer-implemented method comprising:
   receiving, by a client device, a message that is for a user of the client device and originated from another device during a particular time in an output of content;
   determining whether the received message relates to the content;
   responsive to determining that the received message relates to the content, determining a point in time that the received message was sent; and
   coordinating output of the received message with the output of the content to be dependent, at least in part, on whether the point in time that the received message was sent is earlier than the particular time in the output of the content.

2. A computer-implemented method as described in claim 1, wherein the content is a television program and the received message is text based.

3. A computer-implemented method as described in claim 1, wherein the content is broadcast content that is recorded by a client device that performs the receiving, the determining the point in time, and the coordinating.

4. A computer-implemented method as described in claim 1, wherein the particular time in the output of the content is indicated by a timestamp that is comparable directly with a timestamp included in the received message that indicates the point in time the received message was sent.

5. A computer-implemented method as described in claim 1, wherein the coordinating includes translating a timestamp included in the content that indicates the particular time in the output of the content to be comparable with a timestamp included in the received message that indicates the point in time the received message was sent.

6. A computer-implemented method as described in claim 1, wherein the coordinating includes providing an alert that is output before output of the received message indicating that the point in time that the received message was sent is earlier than the particular time in the output of the content.

7. A computer-implemented method as described in claim 1, wherein the determining includes ascertaining whether the received message mentions a title of the content.

8. A computer-implemented method as described in claim 1, wherein the coordinating is based at least in part on a location that relates to where the received message was sent.

9. A computer-implemented method as described in claim 8, wherein the coordinating further includes providing an alert that is output before output of the received message indicating that the point in time that the received message was sent is earlier than the particular time in the output of the content and the location from which the received message was sent corresponds to a location that relates to the content.

10. A computer-implemented method as described in claim 1, wherein the received message is sent via stream that is different than a stream used to provide the content.

11. A client device comprising one or more modules embodied on one or more computer-readable memory devices to:
    output content using one or more time shifting techniques;
    ascertain whether a message received by the client device relates to the content, the ascertainment comprising scanning the message received by the client for keywords, the message for a user of the client device and originated from another client device;
    determine a point in time that the message was sent; and
    manage output of the message based at least in part on whether the determined point in time that the message was sent is earlier than a point in time in the output of the content that has not yet occurred using the one or more time shifting techniques.

12. A client device as described in claim 11, wherein the content is broadcast to the client device and stored based on one or more commands implemented by the client device.

13. A client device as described in claim 12, wherein the content is stored by forming the one or more commands to be communicated over a network to a network digital video recorder.

14. A client device as described in claim 11, wherein the management of the output of the message includes output of an alert that indicates that the determined point in time that the message was sent is earlier than the point in time in the output of the content that has not yet occurred using the one or more time shifting techniques.

15. A client device as described in claim 11, wherein the management of the output of the message is further based on whether a location from which the message was sent corresponds to a location that relates to the content.

16. One or more computer-readable memory devices comprising instructions that are executable by a client device to determine that a message received by the client device, which is for a user of the client device and originated from a sender from another client device, is related to content that is time shifted and was sent at a point in time that is earlier than a particular time in an output of the content and form a notification to be sent from the client device to the sender that originated the message that indicates a result of the determination.

17. One or more computer-readable memory devices as described in claim 16, wherein the instructions are further executable to output the message in conjunction with the content when the point in time the message was sent has passed the particular time in the output of the content.

18. One or more computer-readable memory devices as described in claim 16, wherein the instructions are further executable to output an alert before output of the message indicating that the point in time that the message was sent is earlier than the particular time in the output of the content and a location from which the message was sent corresponds to a location that relates to the content.

\* \* \* \* \*